(12) United States Patent
Ketireddy et al.

(10) Patent No.: US 11,507,655 B1
(45) Date of Patent: Nov. 22, 2022

(54) AUTOMATIC AND PREDICTIVE SOURCE CODE GENERATION

(71) Applicant: Amazon Technologies, Inc., Seattle, WA (US)

(72) Inventors: Raghuveer Ketireddy, Redmond, WA (US); Akshay Gupta, Seattle, WA (US); Trevor Tonn, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 431 days.

(21) Appl. No.: 16/711,329

(22) Filed: Dec. 11, 2019

(51) Int. Cl.
  *G06F 21/54* (2013.01)
  *G06N 3/02* (2006.01)
  *G06N 20/00* (2019.01)
  *G06F 8/70* (2018.01)

(52) U.S. Cl.
  CPC .............. *G06F 21/54* (2013.01); *G06F 8/70* (2013.01); *G06N 3/02* (2013.01); *G06N 20/00* (2019.01)

(58) Field of Classification Search
  CPC .......... G06F 21/125; G06F 21/54; G06F 8/30; G06F 8/33; G06F 8/34; G06F 8/35
  See application file for complete search history.

(56) References Cited

U.S. PATENT DOCUMENTS

| | | | | |
|---|---|---|---|---|
| 7,392,162 B1* | 6/2008 | Srinivasan | ................ | G06F 8/10 703/22 |
| 9,298,453 B2* | 3/2016 | Vangala | ................... | G06F 8/75 |
| 10,521,196 B1* | 12/2019 | Wang | ........................ | G06F 8/33 |
| 10,545,733 B2* | 1/2020 | Sabharwal | ........... | G06N 3/0454 |
| 2008/0127057 A1* | 5/2008 | Costa | ........................ | G06F 8/34 717/106 |
| 2009/0077091 A1* | 3/2009 | Khen | ........................ | G06F 8/34 |
| 2009/0119640 A1* | 5/2009 | Ramsey | .................... | G06F 8/34 717/109 |

(Continued)

OTHER PUBLICATIONS

Todeschini, Marta "A Code Completion System for the Catrobat Visual Programming Language" [Online], Feb. 26, 2018 [Retrieved: Apr. 6, 2022], Università degli Studi di Padova, Retrieved from: < http://tesi.cab.unipd.it/59278/1/tesiMagistraleMartaTodeschini.pdf > (Year: 2018).*

(Continued)

*Primary Examiner* — Eric W Shepperd
(74) *Attorney, Agent, or Firm* — Davis Wright Tremaine LLP (57) ABSTRACT

A design inspector tool generates secure source code related to stencils and design elements of an architecture diagram. The design inspector tool may retrieve source code from a source code repository that includes source code that is relevant to the stencils and design elements implemented by the design inspector tool. When or after a user modifies the source code, the design inspector tool feeds contextual information associated with the stencils and the design elements into a trained machine learning logic. The trained machine learning logic processes the contextual information to retrieve contextually relevant auto complete secure code suggestions from the source code repository. The contextually relevant auto complete source code suggestions may be presented to the user as an option for replacing or augmenting the modified source code.

20 Claims, 6 Drawing Sheets

(56) References Cited

U.S. PATENT DOCUMENTS

| | | | | |
|---|---|---|---|---|
| 2011/0126171 A1* | 5/2011 | Neal | ............... | G06F 8/34 |
| | | | | 717/113 |
| 2014/0109042 A1* | 4/2014 | Christensen | ............... | G06F 8/36 |
| | | | | 717/109 |
| 2014/0359574 A1* | 12/2014 | Beckwith | ............... | G06F 8/33 |
| | | | | 717/113 |
| 2015/0135166 A1* | 5/2015 | Tarlow | ............... | G06F 11/3604 |
| | | | | 717/124 |
| 2015/0339104 A1* | 11/2015 | Frenkiel | ............... | G06F 11/3604 |
| | | | | 717/113 |
| 2017/0329579 A1* | 11/2017 | Laethem | ............... | G06F 3/0482 |
| 2017/0371629 A1* | 12/2017 | Chacko | ............... | G06F 8/36 |
| 2018/0081642 A1* | 3/2018 | Alurralde Iturri | ............... | G06F 8/36 |
| 2019/0303107 A1* | 10/2019 | Kelly | ............... | G06F 8/33 |
| 2019/0303109 A1* | 10/2019 | Fu | ............... | G06F 8/33 |
| 2019/0332968 A1* | 10/2019 | Fu | ............... | G06N 20/00 |
| 2020/0097261 A1* | 3/2020 | Smith | ............... | G06N 3/084 |
| 2020/0150937 A1* | 5/2020 | Smith | ............... | G06N 20/00 |
| 2020/0175316 A1* | 6/2020 | Fu | ............... | G06N 20/00 |
| 2020/0249918 A1* | 8/2020 | Svyatkovskiy | ............... | G06F 17/18 |
| 2020/0319992 A1* | 10/2020 | Masis | ............... | G06N 5/048 |
| 2020/0394555 A1* | 12/2020 | Chauhan | ............... | G06F 16/355 |
| 2020/0410390 A1* | 12/2020 | Fu | ............... | G06F 8/31 |
| 2021/0132913 A1* | 5/2021 | Singh | ............... | G06F 11/3438 |

OTHER PUBLICATIONS

Microsoft, "IntelliSense" Web page <https://code.visualstudio.com/docs/editor/intellisense>, Dec. 4, 2019 [Retrieved: Apr. 3, 2022], retrieved from <cont.> (Year: 2019).*

<V cont.> retrieved from Internet Archive Wayback Machine <http://https://web.archive.org/web/20191204083351/https://code.visualstudio.com/docs/editor/intellisense#_intellisense-features> (Year: 2019).*

* cited by examiner

AUTOMATIC AND PREDICTIVE SOURCE CODE GENERATION

BACKGROUND

Development of source code for a computer program, such as an application, is often a time consuming process. Modern computer programs often include large amounts of code, much of which is linked to other code. A developer may have available a large amount of code from which to build an application, much of which may perform similar functions but have different properties (e.g., different security properties). Consequently, it takes a significant amount of effort to not only create the code, but also to ensure that the code is correct, uses the correct syntax, and correctly integrates with other libraries. While various tools have been developed to facilitate the process of code development, such tools do not fully address all the issues developers have to consider. For instance, a tool may assist with syntax or other aspects of programming but not indicate whether the program being developed is sufficiently secure for the context in which the program is intended to run.

BRIEF DESCRIPTION OF THE DRAWINGS

Various techniques will be described with reference to the drawings, in which.

DETAILED DESCRIPTION

The implementations described in the following relate to source code generation. Specifically, described implementations may relate to automatic or predictive source code generation for computer applications, such as websites, database front ends or back ends, and so forth. A user may create a code design diagram that includes components of a computer program design. The code diagram may be hand-drawn and input into a design inspector tool. Alternatively, the code diagram may be created within the design inspector tool.

The design inspector tool analyzes elements within the code diagram and generates an architecture diagram including discrete design objects. Alternatively, the design inspector tool may include selectable discrete design objects used to create the architecture diagram. Some of the discrete design objects are configurable stencils provided by the design inspector tool. For example, there may be security stencils, user interface stencils, system front end and back end stencils, and so forth. In addition, there may be other design objects selectable within the design inspector tool. Such other design objects, such as foundation elements, may provide greater functionality than stencils, provide connectivity for stencils, and so forth. At least some of these stencils and foundation elements, when selected and associated with an architecture diagram, enable a user to set certain parameters. For example, a security stencil may include selectable security parameters. In one example, a security stencil has user selectable security parameters related to authentication, access control, data in transit, data at rest, and data integrity. The design inspector tool saves the user selected parameters as parameter data for a given stencil. The saved parameter data provides contextual information related to the stencil. In some implementations, the parameter data includes a user selected security setting for the user selectable security parameters.

At some point during the design of the architecture diagram, a user may cause the design inspector tool to generate source code related to stencils and foundation elements of the architecture diagram. In the case of a security stencil that is part of the architecture diagram, the design inspector tool will access a source code library that includes security-related source code to generate the underlying baseline secure source code for the security stencil. The secure source code for the security stencil may be edited and revised by a user of the design inspector tool. The design inspector tool may provide auto complete (e.g., predictive) source code suggestions when the user edits and revises the generated secure source code.

The auto complete source code suggestions are leveraged from trained artificial intelligence, which may include machine learning, deep learning, and/or other artificial machine driven logic that enables machines (e.g., computers, logic circuits, etc.) to use a model to process input data and to generate an output based on patterns and/or associations previously learned by the model via a training process. Those models may be associated with a long short-term memory (LSTM), a Transformer, or recurrent neural network (RNN), to name a few. Each of the foregoing is a sequence to sequence model able to process input data and generate an output based on patterns and/or associations previously learned by the model via a training process.

In one implementation, the auto complete source code suggestions are generated by leveraging a RNN or other sequence to sequence model. The RNN is trained using a corpus of architecture diagram related source code and parameter data (e.g., security parameter data) linked to the source code. The security parameter data (i.e., contextual information) may be derived from security-related stencils and design elements that have associated user selectable parameters related to authentication, access control, and the like. A design analyzer linked to the design inspector tool is used to process the many architecture diagrams and input those architecture diagrams, associated secure source code, and related contextual information into the RNN during an ongoing training process.

To summarize, the design inspector tool generates secure source code related to security stencils and design elements of the architecture diagram. The design inspector tool may retrieve the secure source code from a source code repository that includes at least baseline source code that is relevant to the security stencils and design elements implemented by the design inspector tool. The design inspector tool may include a graphical user interface (GUI) that allows a user to modify the secure source code linked to the security stencils and design elements of the architecture diagram.

When a user modifies the secure source code via the GUI, the design inspector tool feeds the contextual information associated with the security stencils and the design elements into the trained RNN. The trained RNN processes the contextual information to retrieve contextually relevant auto complete secure code suggestions from the source code repository. The contextually relevant auto complete source code suggestions may be presented to the user, via the GUI, as the user modifies the secure source code linked to the security stencils and design elements of the architecture diagram.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Using the techniques described herein for automatic and predictive source code generation, the software design process may be improved and may produce software components of a higher quality. As one skilled in the art will appreciate in light of this disclosure, certain embodiments may be capable of achieving certain advantages, including some or all of the following: (1) improving the performance of software design systems and the computing devices that implement such software design systems by providing contextually relevant automatically generated source code sequences for inclusion in baseline source code; (2) reducing the consumption of compute resources by accelerating source code development through the use of contextually relevant automatically generated source code sequences for inclusion in baseline source code; (3) improving the performance of a machine learning model used to predict contextually relevant source code sequences for inclusion in baseline source code, and thereby reducing the use of compute resources, through the use of an ongoing training process for the machine learning model; (4) improving a user interface associated with software design systems by displaying, within the user interface, contextually relevant automatically generated source code sequences for selection and possible inclusion in baseline source code undergoing revision; (5) providing code developers with auto complete or predictive source code sequences germane to secure source code parameters defined by the developers, which improves the accuracy of secure source code and reduces consumption of computer resources during the code development process; and so forth.

Figure 1:
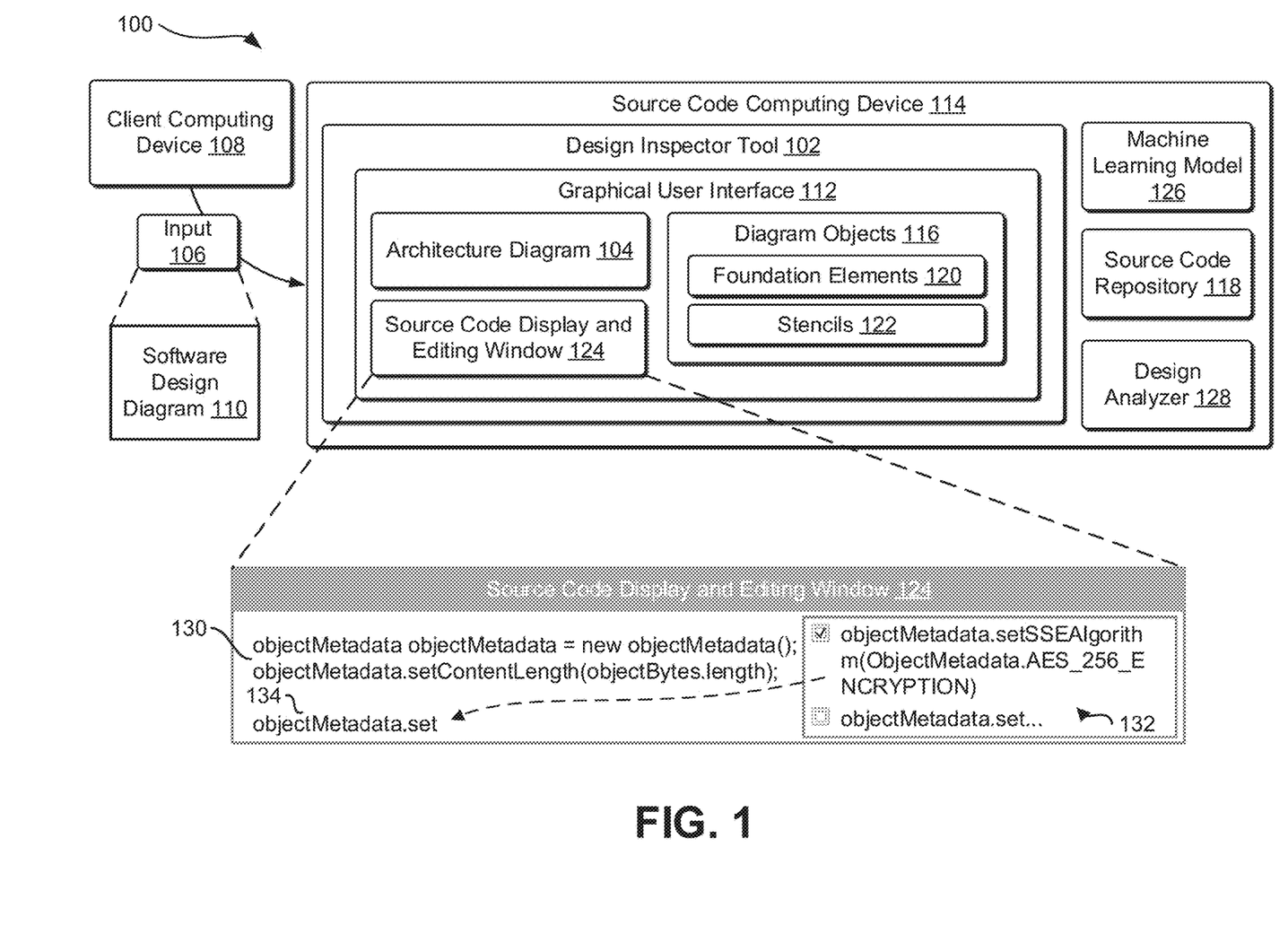
FIG. 1 illustrates an example system environment for automatic and predictive generation of source code, according to some embodiments.

FIG. 1 illustrates an example system environment 100 for automatic generation of source code, according to some embodiments. A design inspector tool 102 may be configured to generate architecture diagrams 104 associated with software products and components of software products. Software products may include executable program code such as applications, services, components of applications, components of services, and so on. Components of software products may include executable programs (e.g., applications, services, packages, and so on), configurations of programs, storage resources (e.g., as managed by network-accessible storage services), configurations of storage resources, database tables, execution environments, hosts or other computing devices, network devices (e.g., routers and load balancers), network entities (e.g., virtual private clouds), abstractions such as host classes, containers, tasks submitted to program execution services, other network-accessible services, and so on. The architecture diagrams 104 may represent such components and their relationships as design elements. Furthermore, architecture diagrams 104 may include software diagrams, dataflow diagrams, sequence diagrams, class diagrams, state machine diagrams, use case diagrams, and so on. In some implementations, the design inspector tool 102 may be implemented by a source code computing device 114.

To generate a particular architecture diagram 104, the design inspector tool 102 may accept input 106 from a client computing device 108. For example, the input 106 may include a software design diagram 110, including placement of the design elements on a two-dimensional (e.g., Cartesian) plane, configuration data and other metadata for design elements, labels and annotations for design elements, and so on.

The input 106 may be received by a graphical user interface (GUI) 112 that is associated with the design inspector tool 102. The GUI 112 may display a visualization of the software design diagram 110 as a representation of a particular architecture diagram 104. In one embodiment, the GUI 112 may be generated (at least in part) by the design inspector tool 102 and may include conventional GUI elements such as windows, sub-windows or panes, buttons, scrollbars, and so on. In some implementations, the GUI 112 is part of an application that implements the design inspector tool 102 or other similar tool. The GUI 112, for example via a plugin or the like, may be associated with Eclipse®, Visual Studio®, IntelliJ®, Autodesk® BIM, or Emacs®, to name a few.

The GUI 112 accepts user input to modify the software design diagram 110 and generate the architecture diagram 104. In one embodiment, the source code computing device 114 is operated by a user, and the GUI 112 may be displayed on a display device associated with the computing device 114. Based on user input representing modifications to the software design diagram 110, the design inspector tool 102 may generate a modified version of the software design diagram 110 and display the modified diagram in the GUI 112 as the architecture diagram 104. In some embodiments, the software design diagram 110 is a hand-drawn diagram to produce a flat image, and the design inspector tool 102 or another component may convert that image into a more complex data structure having discrete design elements. The architecture diagram 104 is such a data structure.

A user may engage the GUI 112 to edit the architecture diagram 104 or create the architecture diagram 104 from scratch. The GUI 112 includes diagram objects 116 that may be leveraged by the user to edit or create the design diagram 104. Each of the design objects 116 has associated baseline source code that is stored in a source code repository 118.

In some implementations, the architecture diagram 104 includes a plurality of the diagram objects 116. The diagram objects 116 may include one or more foundation elements 120 and stencils 122. The diagram objects 116 may be selected for inclusion in the architecture diagram 104. In some implementations, the design objects 116 are offered in a window of the GUI 112 and selectable by user for inclusion in the architecture diagram 104 using a drag-and-drop process.

As will be illustrated in other figures related to this disclosure, the stencils 122 may include security stencils, user interface stencils, system front end and back end stencils, and so forth. The foundation elements 120 may offer greater functionality than stencils 122, provide connectivity for stencils, and so forth. At least some of these stencils 122 and foundation elements 120, when selected and associated with the architecture diagram 104, enable a user to set certain parameters. For example, a security stencil 122 may have selectable security parameters. In one example, a security stencil 122 has user selectable security parameters related to authentication, access control, data in transit, data at rest, and data integrity. The design inspector tool 102 saves the user selected parameters as parameter data for a given stencil 122. The saved parameter data provides contextual information related to a given stencil 122. Furthermore, the user selected parameters and associated parameter data for the stencil 122 may influence, at least in part, the baseline source code of the stencil 122.

At some point during the design of the architecture diagram 104, a user may cause the design inspector tool 102 to generate source code related to stencils 122 and foundation elements 120 of the architecture diagram 104. In the case of a security stencil 122 that is part of the architecture diagram 104, the design inspector tool 102 will access the source code repository 118 that includes security-related source code to generate the underlying baseline secure source code 130 for the security stencil 122. The secure source code 130 for the security stencil 122 may be edited and revised by a user of the design inspector tool 102. For example, the secure source code 130 for the security stencil 122 may be displayed in a source code display and editing window 124 linked to the GUI 112. The displayed source code 130 for the security stencil 122 may be edited by a user via the window 124. Updates and edits to the displayed source code 130 are caused to be associated with the security stencil 120 via the design inspector tool 102.

The design inspector tool 102 may provide auto complete (e.g., predictive) source code suggestions 132 when a user edits and revises a portion 134 the generated secure source code 130 related to stencils 122 and/or foundation elements 120 that are included in the architecture diagram 104. The auto complete source code suggestions 132 are leveraged from trained artificial intelligence, which may include machine learning, deep learning, and/or other artificial machine driven logic that enables machines (e.g., computers, logic circuits, etc.) to use a model 126 to process input data to generate an output based on patterns and/or associations previously learned by the model 126 via a training process. The model 126 may be associated with a long short-term memory (LSTM), a Transformer, or recurrent neural network (RNN), to name a few. Each of the foregoing is a sequence to sequence model able to process input data and generate an output based on patterns and/or associations previously learned by the model 126 via a training process. Additional description related to the generation of auto complete and predictive source code, while a user or after the user has modified the baseline source code, is provided in the following, with reference of FIGS. 2-6.

In one implementation, the auto complete source code suggestions 132 are generated by leveraging the machine learning model 126 embodied as a recurrent neural network (RNN) (e.g., the RNN 126) or other sequence to sequence model. The RNN 126 is trained using a corpus of architecture diagram related source code and security parameter data linked to the source code. The corpus of architecture diagram related source code and security parameter data linked to the source code may be stored in the source code repository 118. The security parameter data (i.e., contextual information) may be derived from security-related stencils 122 and foundation elements 120 that have associated user selectable parameters related to authentication, access control, and the like. A design analyzer 128 linked to the design inspector tool 102 is used to process the many architecture diagrams and input those architecture diagrams, associated secure source code, and related contextual information into the RNN 126 during an ongoing training process.

Figure 6:
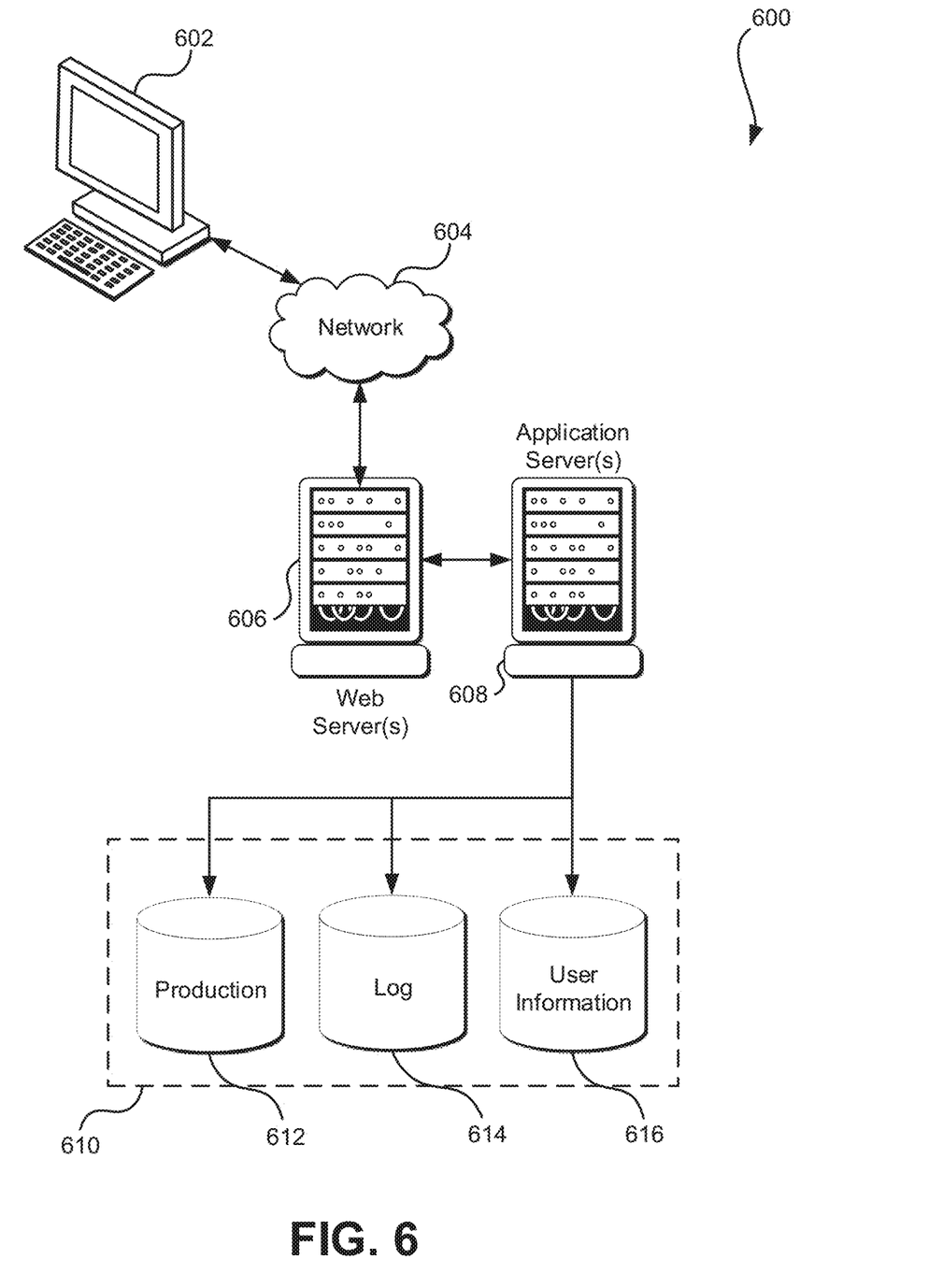
FIG. 6 illustrates a system in which various described embodiments can be implemented.

The design inspector tool 102 may be implemented using any suitable number and configuration of computing devices, such as those implemented by example system 600 illustrated in FIG. 6. The computing devices may be located in any suitable number of data centers or geographical locations. In various embodiments, at least some of the functionality of the design inspector tool 102 may be provided by the same computing device or by different computing devices. If any of the components of the design inspector tool 102 are implemented using different computing devices, then the components and their respective computing devices may be communicatively coupled, e.g., via one or more networks. Each of the components of the design inspector tool 102 may represent any combination of software and hardware usable to perform their respective functions, as discussed herein. Operations implemented by the design inspector tool 102 may be performed automatically, e.g., without a need for user initiation or user intervention after an initial configuration stage, and programmatically, e.g., by execution of program instructions on at least one computing device. It is contemplated that the design inspector tool 102 may include additional components not shown, fewer components than shown, or different combinations, configurations, or quantities of the components shown.

The design inspector tool 102 may be implemented in a service-oriented system in which multiple services collaborate according to a service-oriented architecture. In such an environment, the design inspector tool 102 may offer its functionality as a service to multiple clients. A service may be implemented using a plurality of different instances that are distributed throughout one or more networks, and each instance may offer access to the functionality of the corresponding service to various clients. It is contemplated that any suitable number and configuration of clients may interact with design inspector tool 102. To enable clients to invoke its functionality, the design inspector tool 102 may expose any suitable interface(s), such as one or more APIs or other programmatic interfaces and/or GUIs. In one embodiment, the functionality of the design inspector tool 102 may be offered to clients in exchange for fees.

A computing device associated with the client computing device 108 or source code computing device 114 may convey network-based service requests to the design inspector tool 102 via one or more networks. In various embodiments, the network(s) may encompass any suitable combination of networking hardware and protocols necessary to establish network-based communications between the client 108 or client 114 and the design inspector tool 102. For example, the network(s) may generally encompass the various telecommunications networks and service providers that collectively implement the Internet. The network(s) may also include private networks such as local area networks (LANs) or wide area networks (WANs) as well as public or private wireless networks. For example, both the client 108 or client 114 and the design inspector tool 102 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the client 108 or client 114 and the Internet as well as between the Internet and the design inspector tool 102. It is noted that in some embodiments, the client 108 or client 114 may communicate with the design inspector tool 102 using a private network rather than the public Internet.

In one embodiment, aspects of the design inspector tool 102 may be implemented using computing resources of a provider network. A provider network may represent a network set up by an entity such as a business or a public-sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

In some embodiments, an operator of the provider network may implement a flexible set of resource reservation, control, and access interfaces for their clients. For example, a resource manager may implement a programmatic resource reservation interface (e.g., via a web site or a set of web pages) that allows clients (potentially including other components within the provider network) to learn about, select, purchase access to, and/or reserve compute instances offered by the provider network. Such an interface may include capabilities to allow browsing of a resource catalog and provide details and specifications of the different types or sizes of resources supported, the different reservation types or modes supported, pricing models, and so on.

Figure 2:
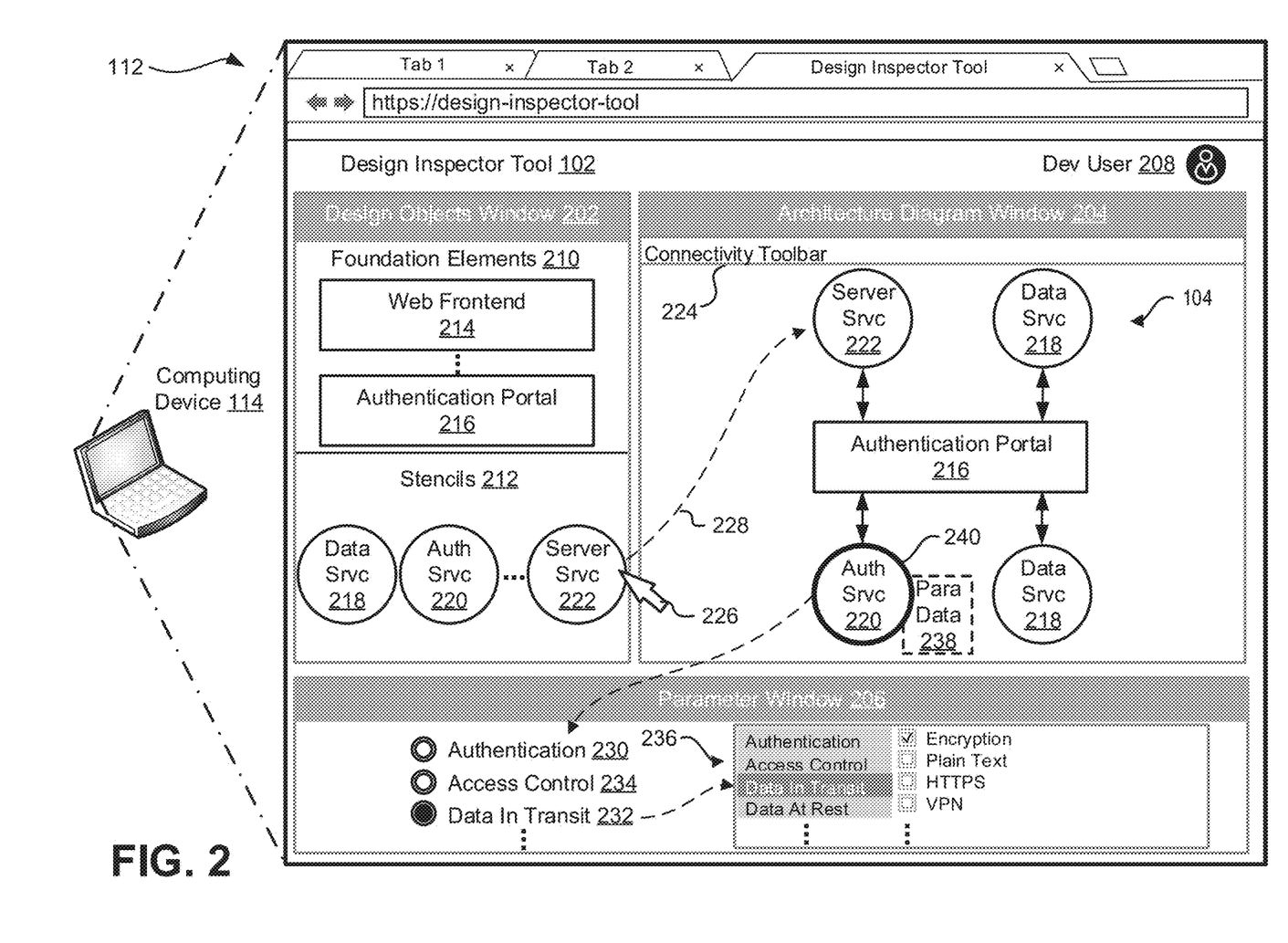
FIG. 2 illustrates a view of a graphical user interface (GUI) provided by a design inspector tool associated with the system environment illustrated in FIG. 1.

FIG. 2 illustrates a view of the GUI 112 provided by the design inspector tool 102. The GUI 112 view shown in FIG. 2 includes a design objects window 202, an architecture diagram window 204, and a parameter window 206. The GUI 112 is not limited to the windows 202, 204 and 206 illustrated in FIG. 2. The GUI 112 also shows that the design inspector tool 102 session is linked to a user (i.e., development user 208). Furthermore, FIG. 2 illustrates that the computing device 114 is hosting the GUI 112.

The design objects window 202 includes a plurality of selectable foundation elements 210 and stencils 212. The design inspector tool 102 is illustrated in FIG. 2 as including two foundation elements 210 and three stencils 212. Specifically, the foundation elements 210 include a web front end element 214 and an authentication portal element 216. The stencils 212 include a data service stencil 218, an authentication service stencil 220, and a server service stencil 222. Each of the foundation elements 210 and stencils 212 have associated baseline code that is retrievable by the design inspector tool 102 from the source code repository 118. The number of foundation elements 210 and stencils 212 shown in FIG. 2 is purely representative. It is contemplated that the design inspector tool 102 may include additional foundation elements and/or stencils not illustrated, fewer such items than illustrated, or different combinations, configurations, or quantities of such illustrated items.

The architecture diagram 104 is displayed in the architecture diagram window 204. As described in the foregoing, the architecture diagram 104 may be a conversion of the software design diagram 110 received as the input 106 at the source code computing device 114. Alternatively, the user 208 may use the design inspector tool 102 to create the architecture diagram 104 illustrated in the architecture design window 204. As another option, the design inspector tool 102 may generate the architecture diagram 104 from the software design diagram 110 received at the source code computing device 114. The user 208 may then modify the generated architecture diagram 104 using the design inspector tool 102.

Generating or otherwise modifying the architecture diagram 104 is possible by way of a drag-and-drop process. The user 208 may select 226 (e.g., via mouse control, voice control, or touch) objects within the design objects window 202 and drag-and-drop 228 selected objects for inclusion in the architecture design window 204 and association with the architecture diagram 104. A connectivity toolbar 224 may be accessed by the user 208 to create connectivity relationships between the objects associated with the architecture diagram 104. For example, the connectivity toolbar 214 may be used to select a bidirectional communication line to couple the server service stencil 222 to the authentication portal 216.

At least some of the foundation elements 210 and the stencils 212 have user selectable one or more parameters. In some implementations, the user 208 may select the authentication portal 216 or one of the stencils 218-222 of the architecture diagram 104 to display user selectable parameters 230-234. The user selectable parameters 230-234 are displayed in the parameter window 206. In this example, the user selectable parameters 230-234 are linked to the authentication (i.e., security) service stencil 220 selected 240 by the user 208. It is contemplated that the foundation element 216 and stencils 218-222 may include user selectable parameters not illustrated, fewer such parameters than illustrated, or different combinations, configurations, types or quantities of such illustrated parameters.

FIG. 2 illustrates that the user 208 has chosen to configure the data in transit 232 parameter associated with the authentication service stencil 220. A parameter window 236 is displayed in response to the user 208 selecting the data in transit 232 parameter option. The parameter window 236 offers several communication protocol options that the user 208 may select. In this example, the user 208 has selected encryption as the level of protection for data in transit, linked to data transport services provided by the authentication service stencil 220. The user selectable parameters 230 and 234 may be configured by the user 208 in the same manner as described in connection with the data in transit 232 parameter. Once one or more of the user selectable parameters 230-234 are defined by the user 208, the design inspector tool 102 stores the user defined parameter settings as parameter data 238 that is associated with a given foundation element or stencil, such as the authentication service stencil 220 in this example.

Figure 3:
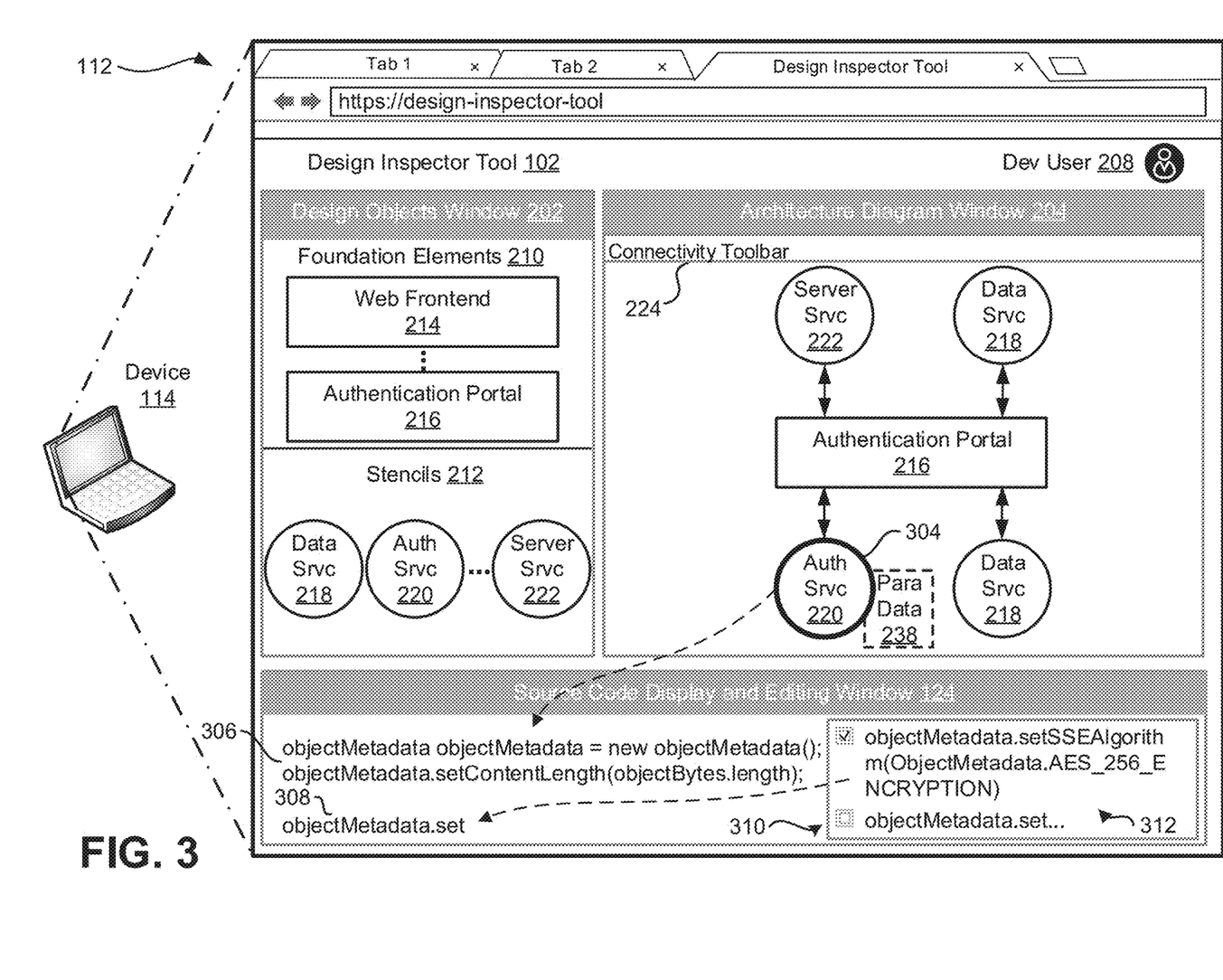
FIG. 3 illustrates another view of the GUI provided by the design inspector tool associated with the system environment illustrated in FIG. 1.

FIG. 3 illustrates another view of the GUI 112 provided by the design inspector tool 102. In this view, the GUI 112 associated with the design inspector tool 102 is illustrated to include the source code editing window 124. The design inspector tool 102 is implemented to display the source code editing window 124 when the user 208 selects a foundation element 210 or stencil 212 to cause the design inspector tool 102 to retrieve associated baseline source code from the source code repository 118. In the illustrated example, the user 208 selects 304 the authentication service stencil 220 to view baseline source code 306 associated therewith. This action by the user 208 causes the design inspector tool 102 to retrieve the baseline source code 306 from the source code repository 118, and display the baseline source code 306 in the source code editing window 124. In this example, only a portion of the baseline source code 306 is displayed in the source code editing window 124, and the displayed portion of the baseline source code 306 relates to data in transit data transport services provided by the authentication service stencil 220.

The user 208 may need to edit the baseline source code 306. Specifically, it may be necessary to refine the baseline source code 306 so that it conforms to a use scenario of the authentication service stencil 220 in the architecture diagram 104. In this example, the user 208 is editing a portion of the baseline source code 306, associated with the authentication service stencil 220, which defines the manner in which data in transit is secured. As described heretofore, the design inspector tool 102 is implemented to leverage a trained machine learning model (e.g., the RNN 126) and the parameter data 238 to provide auto complete or predictive source code sequences when the user 208 refines the baseline source code 306.

In this example, the user 208 is actively revising the baseline source code 306 to include the code segment 308 that defines the manner in which data in transit is secured. The design inspector tool 102, while the user is actively revising the baseline source code 306, may display a predictive source code window 310 with one or more source code sequences 312 that may be selected by the user 208 to augment or replace the code segment 308. In another example, the design inspector tool 102, while the user is actively revising the baseline source code 306, may automatically and predictably augment or replace the code segment 308 with a highest ranked candidate source code sequence from the one or more source code sequences 312. In yet another example, the design inspector tool 102, while the user is actively revising the baseline source code 306, may automatically and predictably augment or replace the code segment 308 with a highest ranked candidate source code sequence from the one or more source code sequences 312 and display other one or more source code sequences 312 in the predictive source code window 310.

As indicated, the design inspector tool 102 generates the auto complete source code sequences 312 by leveraging the RNN 126 or other trained machine learning model. The RNN 126 is trained using a corpus of architecture diagram related source code and parameter data linked to the source code. The corpus of architecture diagram related source code and parameter data linked to the source code may be stored in the source code repository 118. The parameter data (i.e., contextual information) may be derived from stencils 122 and foundation elements 120 that have associated parameter data, derived from user selectable parameters, related to authentication, access control, security, authentication, and the like. The design analyzer 128 linked to the design inspector tool 102 is used to process the many architecture diagrams and input those architecture diagrams, associated source code, and related contextual information into the RNN 126 during an ongoing training process.

Therefore, the design inspector tool 102 obtains the one or more source code sequences 312 by supplying the parameter data 238, which includes the user selected setting that data in transit is to be encrypted (see FIG. 2, the data in transit 232 user selected option), as input to the RNN 126 or other trained machine learning model. The RNN 126 processes the parameter data 238 to generate an output, including the one or more source code sequences 312, based on patterns and/or associations previously learned by the RNN 126 via a training process. The RNN 126 may output the one or more source code sequences 312 in ranked order based on the patterns and/or associations previously learned by the RNN 126.

The design inspector tool 102 may aid in the ongoing training of the RNN 126. After the user 208 confirms the use of a source code sequence 312 to augment a portion of the baseline source code 306, the design inspector tool 102 will provide the modified baseline source code 306 and the parameter data 238 as training data input to the RNN 126. Therefore, the performance of the RNN 126 is consistently being improved through an ongoing training process facilitated by the design inspector tool 102.

Figure 4:
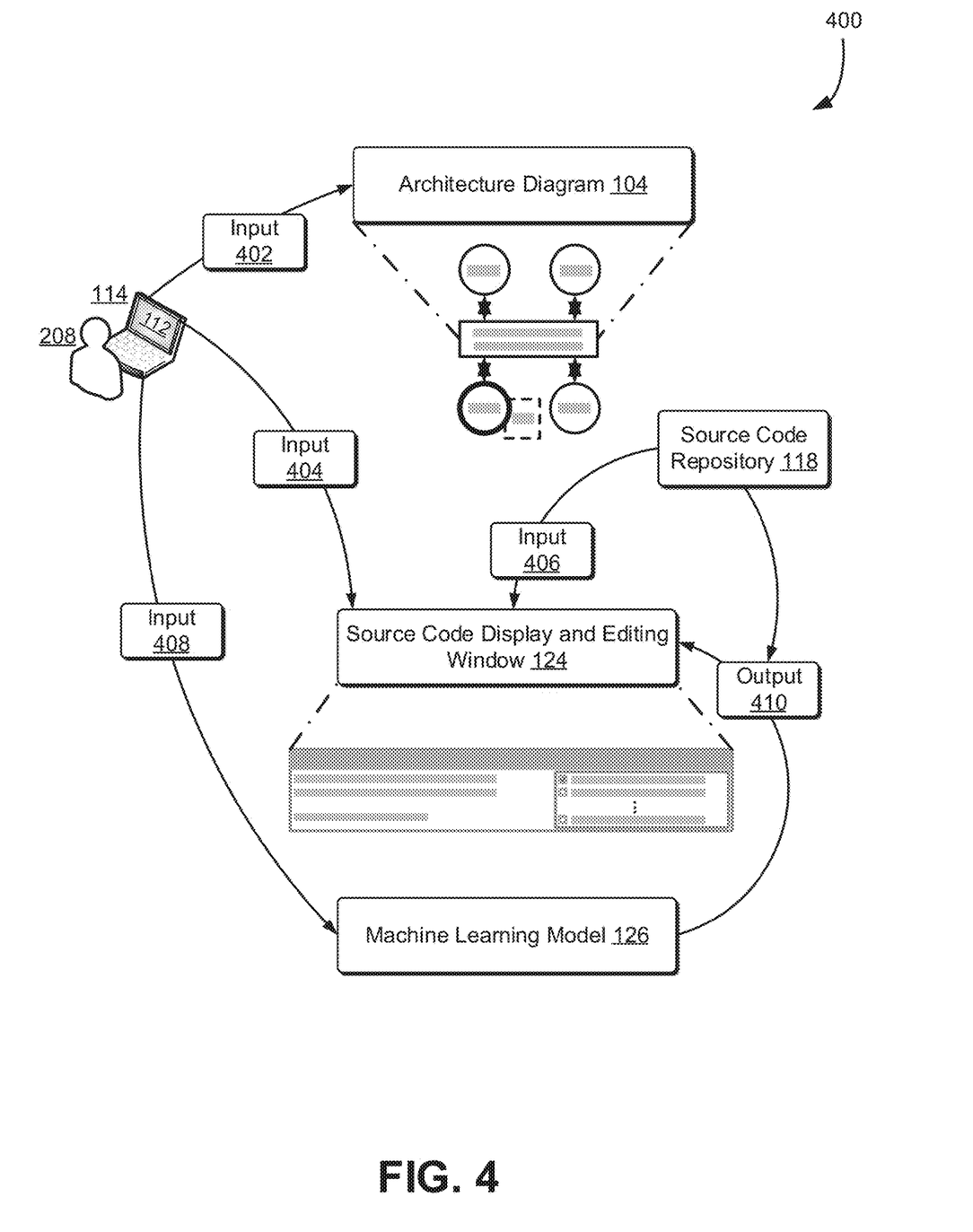
FIG. 4 illustrates an example data flow scenario that may be associated with the system environment, illustrated in FIG. 1, for automatic and predictive generation of source code.

FIG. 4 illustrates an example data flow scenario 400 that may be associated with the system environment 100 for automatic and predictive generation of source code. In some implementations, the data flow scenario 400 is implemented by the source code computing device 114 and one or more of the operational elements associated with the source code computing device 114. In other implementations, the data flow scenario 400 is implemented by operational elements associated with a plurality of computing devices, where such computing devices may implement one or more of the operational elements provided by the source code computing device 114.

In some implementations, the user 208 interfaces with the computing device 114 and the GUI 112 to provide input 402 comprising data that the design inspector tool 102 interprets to generate the architecture diagram 104. The architecture diagram 104 may include one or more foundation elements 210 and one or more stencils 212. One or more of the foundation elements 210 and/or one or more of the stencils 212 may include parameters that may be selected and defined by the user 208 to generate parameter data, such as the parameter data 238.

The user 208 may further interface with the computing device 114 and the GUI 112 to provide input 404 that causes the design inspector tool 102 to display baseline source code underlying one or more objects included in the architecture diagram 104. In some implementations, the baseline source code is displayed in the source code display and editing window 124. The baseline source code may be provided by the source code repository 118 as input 406 received by the source code display and editing window 124.

The input 404 may further comprise data indicating that the user 208 is editing the baseline source code displayed in the source code display and editing window 124. The design inspector tool 102 responds, to the input 404 including the data indicating that the user 208 is editing the baseline source code, by inputting the parameter data associated with the baseline code being edited as input 408 to the trained machine learning model 126. The input 408, in some implementations, may also include some or all of the baseline source code being edited and/or a reference to the baseline source code associated with the parameter data received by the trained machine learning model 126.

The machine learning model 126 processes the parameter data, and the baseline source code and/or the reference to the baseline source code when included with the input 408, to generate an output 410, which includes the one or more source code sequences. The output 410 is generated based on patterns and/or associations previously learned by machine learning model 126 via a training process. The output 410 is provided to the design inspector tool 102, in particular, the output 410 processed by the tool 102 for display in the source code display and editing window 124. The machine learning model 126 may output the one or more source code sequences 312 in ranked order based on the patterns and/or associations previously learned by the machine learning model 126. The machine learning model 126 may access a source code repository, such as the source code repository 118, to retrieve the output 410 that includes the one or more source sequences relevant to the parameter data and the portion of the baseline source code undergoing editing or modified by the user 208.

Figure 5:
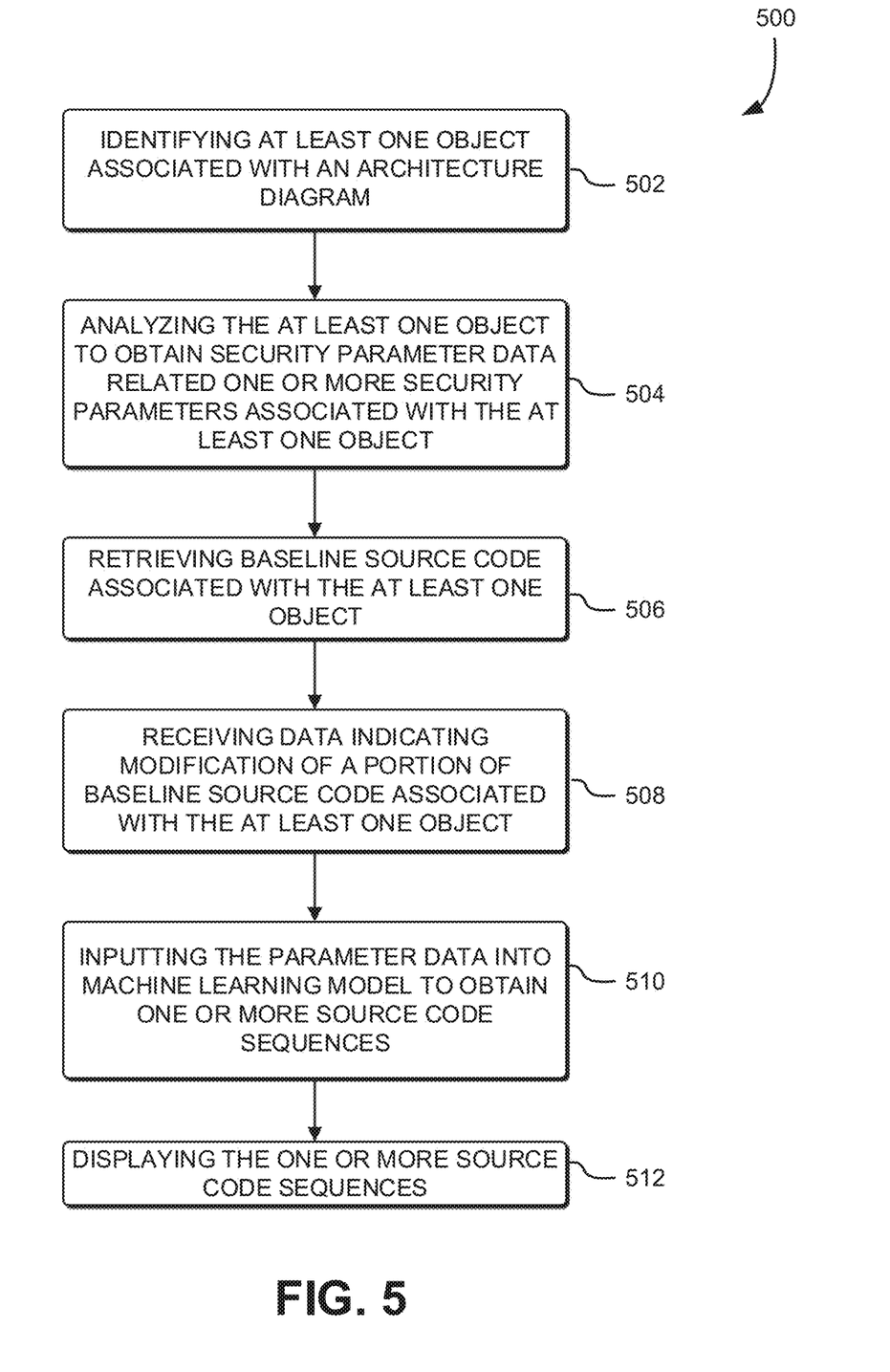
FIG. 5 illustrates a flow diagram including various processing acts, implemented by a system environment with one or more computing devices, which provide automatic and predictive generation of source code.

FIG. 5 illustrates a flow diagram 500 including various processing acts, implemented by a system environment with one or more computing devices, which provide automatic and predictive generation of source code. In some implementations, the acts of the flow diagram 500 are executed by one or more computing devices of the example system environment 100 illustrated in FIG. 1. The example system environment 100 may execute computer-executable instructions incorporating at least some of the processing acts of the flow diagram 500 to provide automatic and predictive generation of source code.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer-readable instructions included on a computer-storage media. The term "computer-readable instructions," and variants thereof, as used in the description and claims, is used expansively herein to include routines, applications, application modules, program modules, system modules, programs, components, data structures, algorithms, and the like. Computer-readable instructions can be implemented on various system configurations, including single-processor or multiprocessor systems, minicomputers, mainframe computers, distributed computer systems, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules might be implemented in software, in firmware, in special purpose digital logic, and any combination thereof.

At block 502, at least one object associated with an architecture diagram generated by a design inspector tool is identified. The design inspector tool may be implemented by a computing device, such as the computing device 114 and/or one or more of the devices associated with system 600. The design inspector tool may include a plurality of selectable objects usable to configure the architecture diagram. Each of the objects may have associated baseline source code. The baseline source code may be stored in a source code repository of the system environment. In some implementations, some of the objects are security objects that include underlying security-related baseline source code. Other objects may be user interface objects that include underlying user interface related baseline source code. Furthermore, other objects may be database front end or back end objects that include underlying database specific baseline source code.

At block 504, at least one object is analyzed to obtain parameter data related one or more parameters associated with the at least one object. In some implementations, the parameter data includes security parameter data related to one or more security parameters associated with the object. In some implementations, the parameter data comprises a user selected setting for a user settable parameter linked to the object.

At block 506, baseline source code associated with the at least one object is retrieved. In some implementations, the baseline source code may be retrieved from the source code repository.

At block 508, data is received indicating that a portion of the baseline source code was modified or that the portion of the baseline source code is currently being modified.

At block 510, the parameter data is input into a machine learning model. In some implementations, the machine learning model is trained using a corpus of source code and a collection of parameter data associated with the corpus of source code. The machine learning module processes the parameter data and retrieves one or more source code sequences. The one or more source code sequences may be related to the portion of the baseline source code that was modified or the portion of the baseline source code that is currently being modified. The machine learning model may access the source code repository to retrieve the one or more source code sequences. In some implementations, the machine learning model is an RNN or other sequence to sequence ML model. The RNN may be trained to process the parameter data and retrieve the one or more source code sequences. In some implementations, the RNN is trained with a corpus of architecture diagram related source code and a collection of parameter data such as a security-related parameter data, associated with the corpus of architecture diagram related source code.

At block 512, the one or more source code sequences are displayed in response to the data indicating that at least a portion of the baseline source code was modified, or that the at least a portion of the baseline source code is currently being modified. In some implementations, the one or more source code sequences are displayed in a GUI associated with a software design tool. Furthermore, in some implementations, the one or more source code sequences replace the portion of the baseline source code undergoing modification or the portion of the baseline source code that was modified.

FIG. 6 illustrates aspects of an example system 600 for implementing aspects in accordance with an embodiment. As will be appreciated, although a web-based system is used for purposes of explanation, different systems may be used, as appropriate, to implement various embodiments. In an embodiment, the system includes an electronic client device 602, which includes any appropriate device operable to send and/or receive requests, messages, or information over an appropriate network 604 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 606 for receiving requests and serving content in response thereto, although for other networks an alternative device serving a similar purpose could be used as would be apparent to one of ordinary skill in the art.

In an embodiment, the illustrative system includes at least one application server 608 and a data store 610, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 602 and the application server 608, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 610, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 612 and user information 616, which are used to serve content for the production side. The data store also is shown to include a mechanism for storing log data 614, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 610.

The data store 610, in an embodiment, is operable, through logic associated therewith, to receive instructions from the application server 608 and obtain, update or otherwise process data in response thereto, and the application server 608 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 602. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 600 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 600, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase °, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors— for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   identifying at least one object associated with an architecture diagram generated by a design inspector tool, the design inspector tool implemented by a computing device and comprising a plurality of selectable objects usable to configure the architecture diagram, individual ones of the plurality of selectable objects associated with baseline source code;
   analyzing the at least one object to obtain security parameter data related to one or more security parameters associated with the at least one object;
   retrieving the baseline source code associated with the at least one object;
   receiving data indicating that a portion of the baseline source code is being modified;
   inputting the security parameter data into a sequence to sequence machine learning (ML) model, the sequence to sequence ML model trained to process the security parameter data and retrieve one or more source code sequences, related to the portion of the baseline source code being modified, based at least in part on the security parameter data, the sequence to sequence ML model trained using a corpus of architecture diagram related source code and a collection of security parameter data associated with the corpus of architecture diagram related source code; and
   displaying the one or more source code sequences in response to receiving the data indicating that the portion of the baseline source code is being modified.

2. The computer-implemented method of claim 1, wherein the one or more source code sequences are displayed proximal to the baseline source code being modified, the one or more source code sequences being user selectable for incorporation in the baseline source code.

3. The computer-implemented method of claim 1, wherein the one or more security parameters associated with the at least one object is a data in transit parameter, an access control parameter, an authentication parameter, a data at rest parameter, or a data integrity parameter, and wherein the security parameter data comprises a user selected security setting for the one or more security parameters.

4. The computer-implemented method of claim 1, wherein the displaying comprises replacing the portion of the baseline source code being modified with the one or more source code sequences.

5. The computer-implemented method of claim 1, wherein the sequence to sequence ML model is a recurrent neural network (RNN) and the one or more source code sequences are stored in a source code repository comprising source code correlated to security parameter data.

6. A system, comprising:
   at least one computing device comprising at least one processor embodied at least partly in hardware, the at least one computing device configured to implement one or more services, wherein the one or more services:
   obtain parameter data related to one or more parameters associated with at least one object in a software design graphical user interface (GUI);
   receive data indicating modification of a portion of baseline source code associated with the at least one object; and
   input the parameter data into a machine learning model, the machine learning model trained to process the parameter data and retrieve one or more source code sequences, related to the portion of the baseline source code, based at least in part on the parameter data, the machine learning model trained using a corpus of source code and a collection of parameter data associated with the corpus of source code.

7. The system of claim 6, wherein the parameter data comprises security parameter data related to one or more parameters associated with the at least one object.

8. The system of claim 6, wherein the machine learning model comprises a sequence to sequence machine learning (ML) model or a recurrent neural network (RNN) trained using the corpus of source code and the collection of parameter data associated with the corpus of source code.

9. The system of claim 6, wherein the collection of parameter data comprises a collection of security parameter data.

10. The system of claim 6, wherein the one or more services, implemented by the at least one computing device, display the one or more source code sequences in response to receiving the data indicating modification of the portion of baseline source code associated with the at least one object.

11. The system of claim 10, wherein the one or more services, implemented by the at least one computing device, display at least the portion of baseline code, and wherein the one or more source code sequences are displayed proximal to the portion of baseline source code, the one or more source code sequences being user selectable for incorporation with the baseline source code.

12. The system of claim 6, wherein the one or more parameters associated with the at least one object is a data in transit parameter, an access control parameter, an authentication parameter, a data at rest parameter, or a data integrity parameter, and wherein the parameter data comprises a user selected security setting for the one or more parameters.

13. The system of claim 6, wherein the one or more source code sequences are stored in a source code repository comprising source code correlated to parameter data.

14. A non-transitory computer-readable storage medium storing thereon executable instructions that, as a result of being executed by one or more processors of a computer system, cause the computer system to at least:
   detect modification of at least a portion of source code;
   use a machine learning model to identify at least one source code sequence to replace the portion of source code, the machine learning model trained using a corpus of source code and a collection of parameter data associated with the corpus of source code, wherein the machine learning model processes parameter data associated with the portion of source code to identify the at least one source code sequence; and
   provide the at least one source code sequence, the at least one source code sequence provided to replace the portion of source code.

15. The non-transitory computer-readable storage medium of claim 14, wherein the instructions further comprise instructions that, as a result of being executed by the one or more processors, cause the computer system to display the one or more source code sequences in response to detecting the modification of at least the portion of source code.

16. The non-transitory computer-readable storage medium of claim 14, wherein the parameter data comprises a user selected setting for one or more parameters associated with the source code, the one or more parameters including a data in transit parameter, an access control parameter, an authentication parameter, a data at rest parameter, or a data integrity parameter, and wherein the parameter data comprises a user selected security setting for the one or more parameters associated with the portion of source code.

17. The non-transitory computer-readable storage medium of claim 14, wherein the source code is associated with an object used in architecture diagram implemented by a software design tool.

18. The non-transitory computer-readable storage medium of claim 14, wherein the instructions further comprise instructions that, as a result of being executed by the one or more processors, cause the computer system to display the one or more source code sequences in response to detecting the modification of at least the portion of source code, the one or more source code sequences displayed contemporaneously with an ongoing modification of the portion of source code.

19. The non-transitory computer-readable storage medium of claim 14, wherein the machine learning model comprises a sequence to sequence machine learning (ML) model or a recurrent neural network (RNN) trained using the corpus of source code and the collection of parameter data associated with the corpus of source code.

20. The non-transitory computer readable storage medium of claim 19, wherein the RNN is trained using a corpus of security source code and a collection of security parameter data associated with the corpus of security source code.

* * * * *